Figure 1:
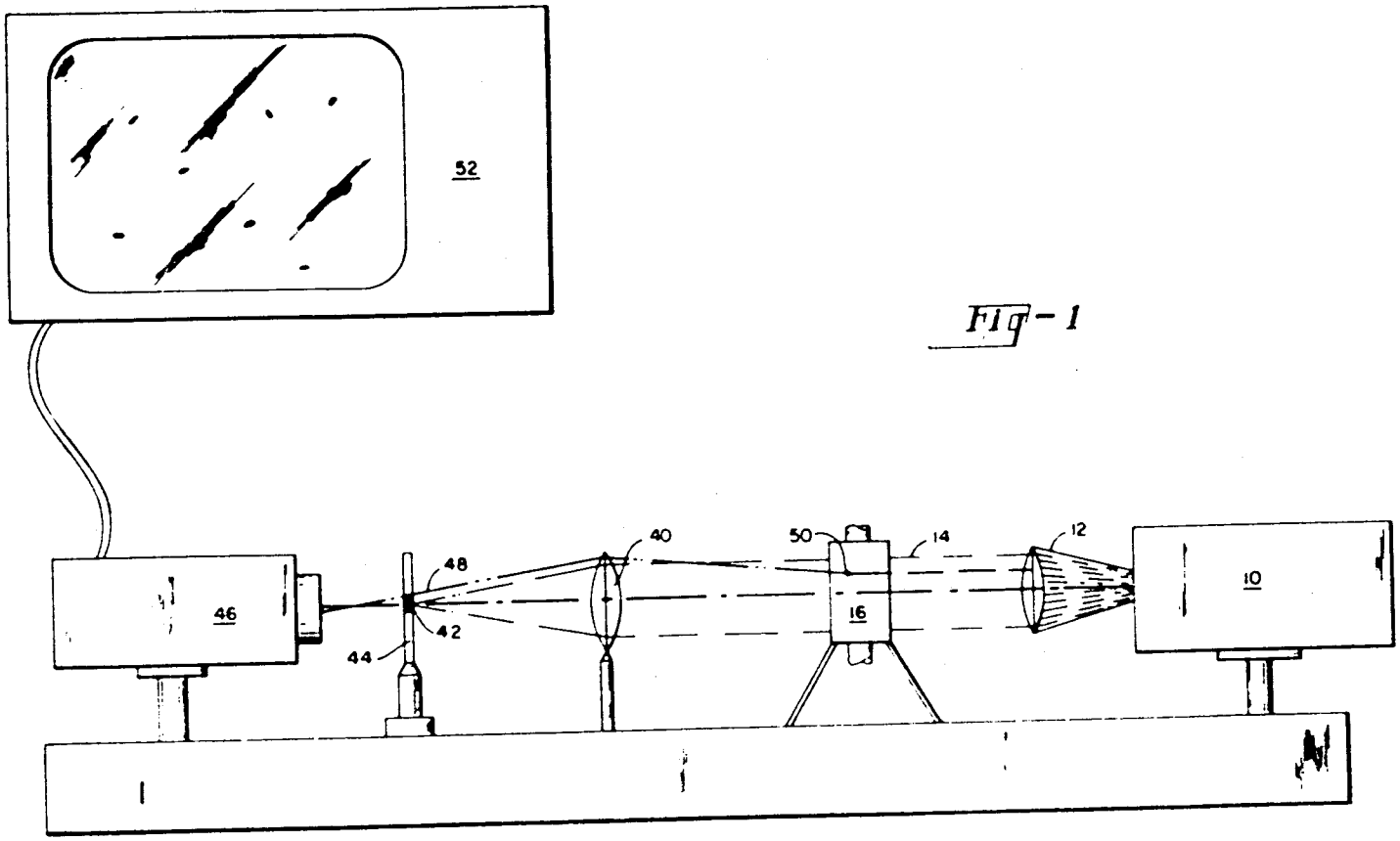
Figure 3:
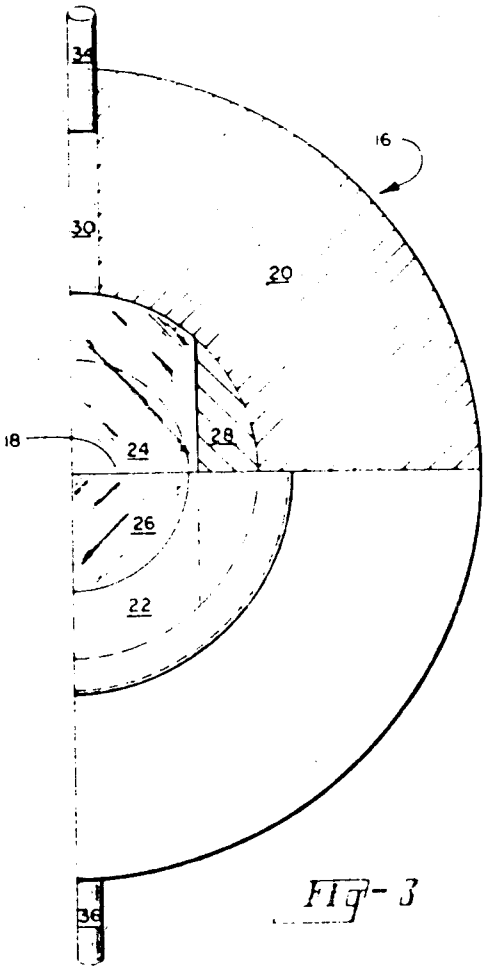
Figure 2:
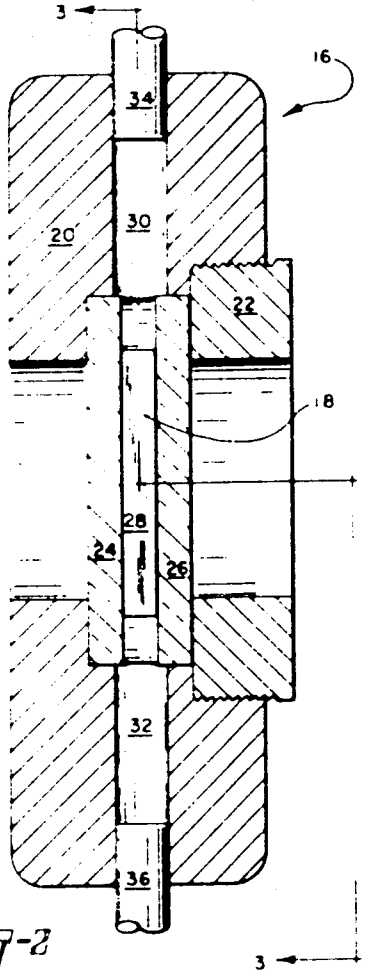
Figure 4:
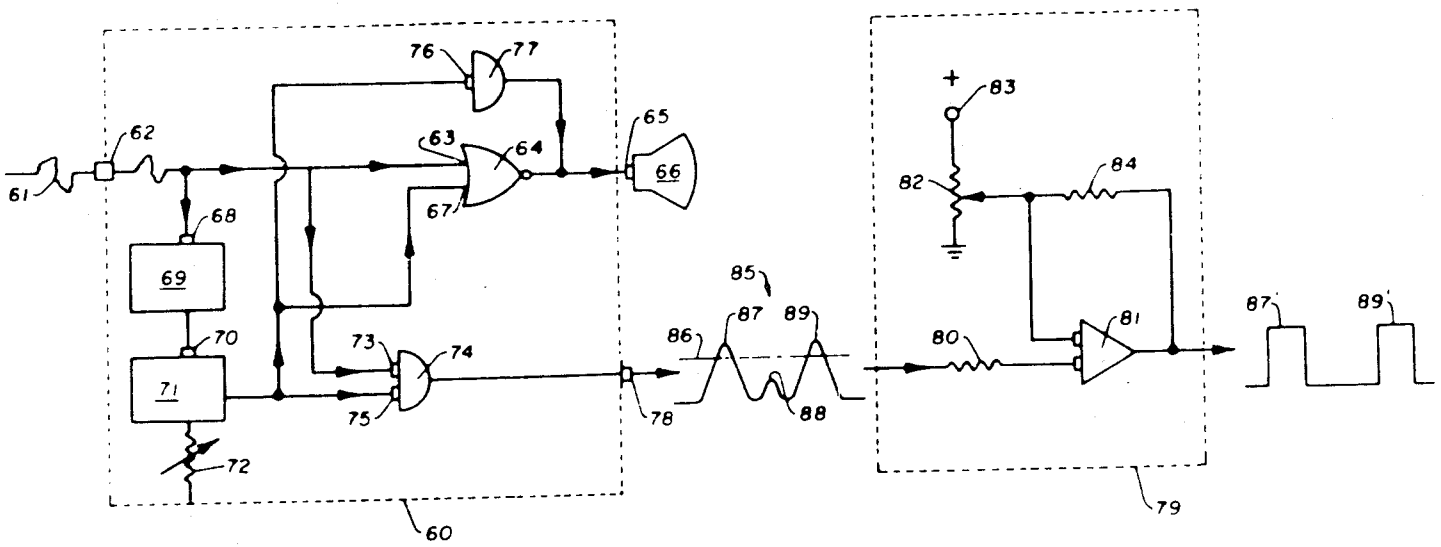
Figure 5:
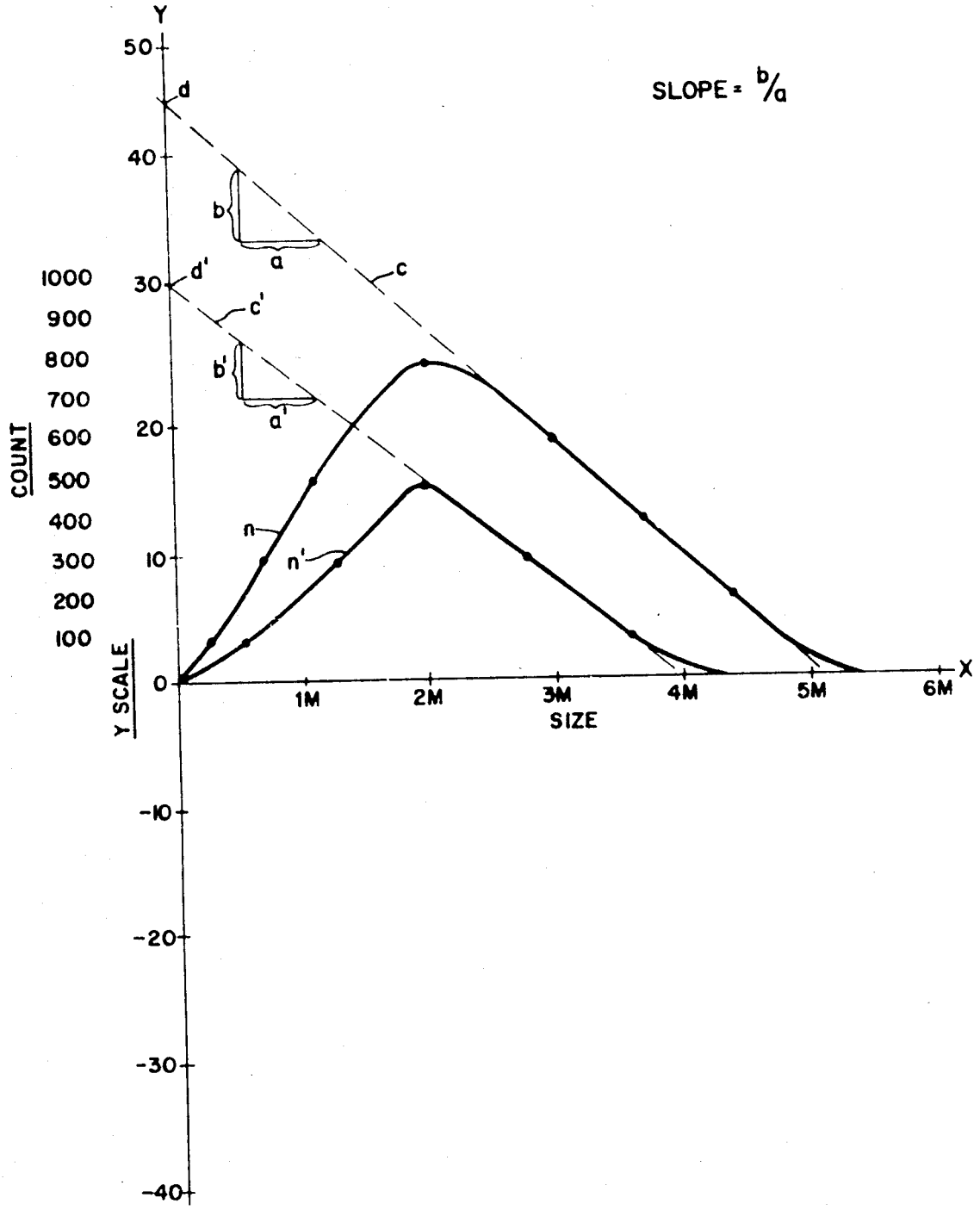

United States Defensive Publication [19] (H) [11] T988,004

Nations [43] Nov. 6, 1979

[54] METHOD OF ANALYZING DATA

[76] Inventor: Ronald G. Nations, 4539 Preston Dr., Kingsport, Tenn. 37664

[21] Appl. No.: 16,463

[22] Filed: Mar. 1, 1979

[51] Int. Cl.[2] ..... G06F 15/36

[52] U.S. Cl. ..... 364/554

[57] ABSTRACT

Disclosed is a method for obtaining useful information from a collection of data in which a measured quantity is related to a physical property comprising the steps of (a) measuring a physical property such as size of a multiplicity of objects, (b) classifying the measurements into ranges according to relative value, (c) counting the number of units within each classification range, (d) plotting the data according to count of each classification, (e) forming a line representing the plotted data, and (f) measuring the slope and intersect of a selected segment of the line to obtain useful information concerning the relationship between the measured quantity and physical property.

The method is useful for obtaining size and count of gel particles in a cellulose ester spinning solution and is carried out with a schlieren optical system, television camera, and digital computer.

5 Claims, 4 Sheets Drawing,

22 Pages Specification

The file of this unexamined application may be inspected and copies thereof may be purchased (849 O.G. 1221, Apr. 9, 1968)

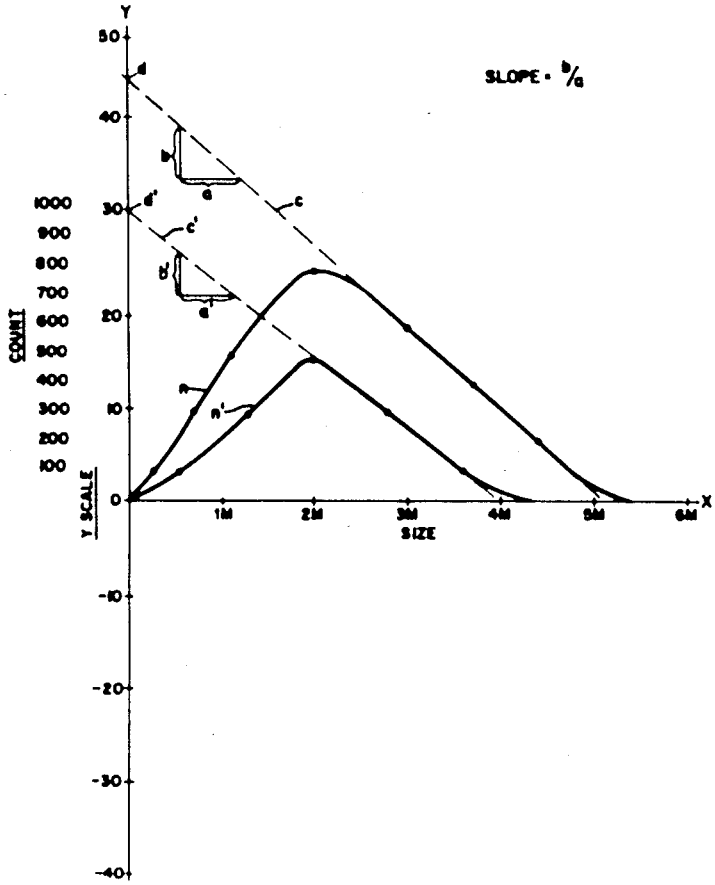

BEST AVAILABLE COPY

BEST AVAILABLE COPY